United States Patent [19]

Kelley

[11] 3,889,772

[45] June 17, 1975

[54] TAIL PIPE SYSTEM

[75] Inventor: Charles N. Kelley, Dallas, Tex.

[73] Assignee: Harold Schnair, Delta Quality, Dallas, Tex.

[22] Filed: Nov. 21, 1973

[21] Appl. No.: 417,899

[52] U.S. Cl. ............ 180/64 A; 138/178; 285/168; 285/184
[51] Int. Cl.² ........................................ B60K 13/04
[58] Field of Search ......... 180/64 A; 138/109, 155, 138/103, 177, 178; 285/181, 184, 163, 168, 120; 137/351, 354

[56] References Cited
UNITED STATES PATENTS

| | | | |
|---|---|---|---|
| 2,308,607 | 1/1943 | Jackson | 180/64 A UX |
| 3,084,971 | 4/1963 | Schilberg | 180/64 A X |
| 3,593,750 | 7/1971 | Zautner | 180/64 A X |

FOREIGN PATENTS OR APPLICATIONS

| | | | |
|---|---|---|---|
| 308,698 | 2/1969 | Sweden | 285/181 |
| 22,757 | 1909 | United Kingdom | 285/184 |

Primary Examiner—David Schonberg
Assistant Examiner—Milton L. Smith
Attorney, Agent, or Firm—Richards, Harris & Medlock

[57] ABSTRACT

A tail pipe system used with a plurality of different makes and models of vehicles for conveying engine exhaust gases from a point located to the front of the rear wheel axle to a point adjacent to the rear of the vehicle.

8 Claims, 6 Drawing Figures 3,889,772

TAIL PIPE SYSTEM

BACKGROUND OF THE INVENTION

The present invention relates generally to improvements in tail pipes. In another aspect, this invention relates to a new and improved tail pipe construction for use with a plurality of makes and models of automobiles.

In the retail sales and installation of replacement tail pipes for vehicles, it has been a common practice to manufacture and stock tail pipes with different lengths and shapes as required to fit all the plurality of models and makes of vehicles in use. One problem present in the production, sales, and installation of these replacement tail pipes, is that very few if any of the plurality of models and makes of automobiles use a common length or configuration of tail pipes. In fact, hundreds of shapes and lengths of tail pipes are required to maintain a complete stock. This large number of these tail pipes and their excessive lengths present storage, shipping, and inventory problems not commonly found in any other part of the automobile industry.

To solve these problems present in the tail pipe industry, multiple-fit tail pipes have been proposed. Some of these multiple-fit tail pipes involve lengths of flexible tubing, but these systems have not proved entirely satisfactory for the reason that flexible tubing is not as durable as solid tail pipes, and tends to be more expensive. In other systems, multi-section tail pipes have been proposed but these multi-section pipes have not proved entirely satisfactory because they have not provided the versatility required to fit a plurality of different automobile models and makes.

SUMMARY OF THE INVENTION

Therefore, according to one embodiment of the invention, an improved tail pipe system of rigid sections is provided with a connection allowing angular adjustment between the portion of the tail pipe extending over the rear wheel axle and the portion extending to the rear of the vehicle. According to another aspect of the present invention, connections are provided for allowing angular adjustment between the portion of the tail pipe which extends over the rear axle and the portion extending to the front of the rear axle. These improved connections allow the tail pipe system to be used on a plurality of different models and makes of vehicles by adjusting the relative positions of the various sections and the connections so that relative movement will not occur once the system has been installed.

The objects and many of the attendant advantages of the present invention will be readily appreciated by those of ordinary skill in the art as the same becomes better understood by reference to the following detailed description when considered in connection with the accompanying drawings in which:

DESCRIPTION OF THE PREFERRED EMBODIMENTS

Figure 1:
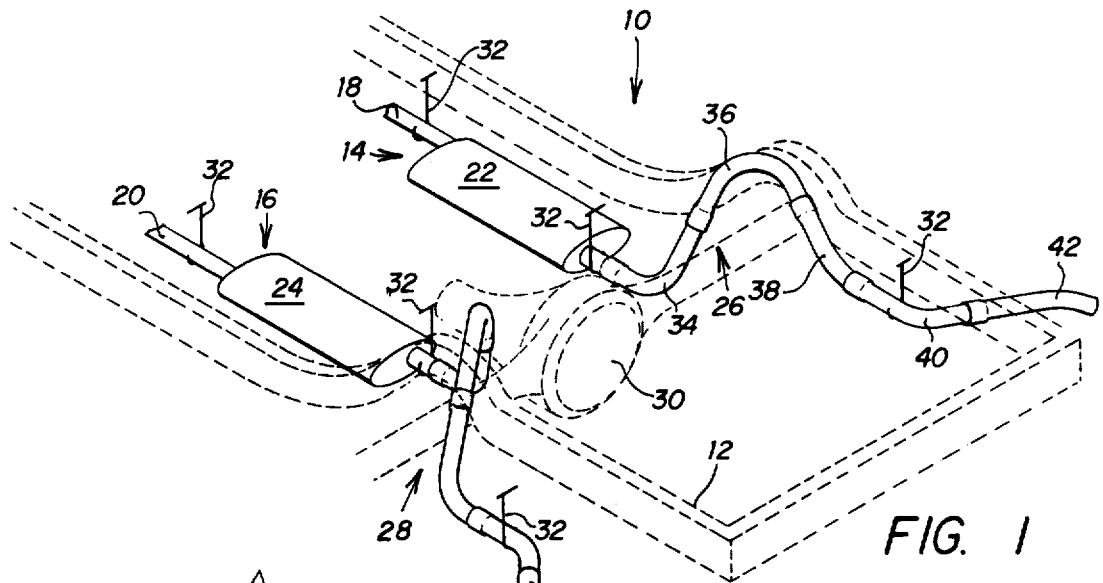
FIG. 1 illustrates a perspective view of one embodiment of the improved tail pipe system of the present invention illustrating the tail pipes installed on the rear frame of a vehicle.

Referring now to the Drawings, wherein like reference characters designate like or corresponding parts throughout the several views, there is illustrated in FIG. 1 a dual exhaust system 10 attached to the frame 12 of a vehicle. The system 10 has a right and left exhaust system 14 and 16. The right and left exhaust systems 14 and 16 each have portions of metallic conduits 18 and 20, respectively, extending from the exhaust manifold of the engine of the vehicle to the mufflers 22 and 24, respectively. These conduits, 18 and 20, convey exhaust gases from the engine to the mufflers 22 and 24, respectively. The mufflers 22 and 24 are provided to create sufficient back pressure and to reduce the noises present in the exhaust gases.

The improved tail pipe systems 26 and 28 of the present invention are connected, respectively, to the mufflers 22 and 24. These tail pipe systems 26 and 28 conduct exhaust gases from the exit or discharge of the mufflers 22 and 24 to points adjacent to the rear of the vehicle. In the present invention, the tail pipe systems 26 and 28 are constructed in one embodiment of the improved tail pipe system of the present invention with an identical tail pipe construction fitting on both left and right sides of the vehicle. It is also to be understood, of course, that the improved tail pipe system of the present invention could be utilized in a vehicle requiring only a single exhaust system.

The tail pipe systems 26 and 28 are designed for connection to the mufflers 22 and 24, respectively, and extend up over the rear axle assembly 30 of the vehicle to provide sufficient clearance for the relative movement between the rear axle assembly 30 and the frame 12. A plurality of conventional supports 32 are used to suspend the exhaust system 10 from the frame 12.

Figure 2:
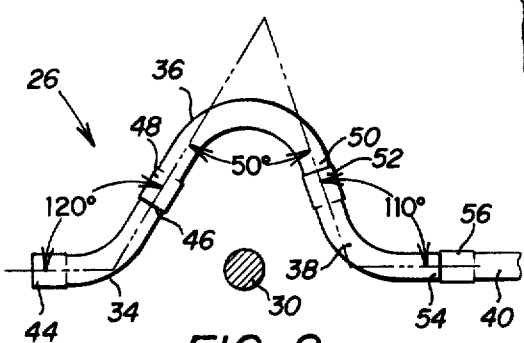
FIG. 2 is a side elevation of a portion of one of the improved tail pipe systems illustrated in FIG. 1.
Figure 3:
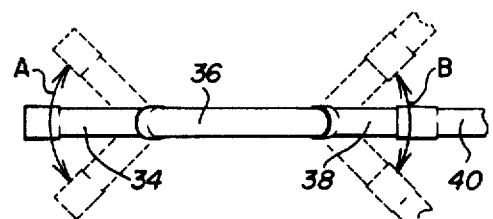
FIG. 3 is a plan view of a section illustrated in FIG. 2.
Figure 4:
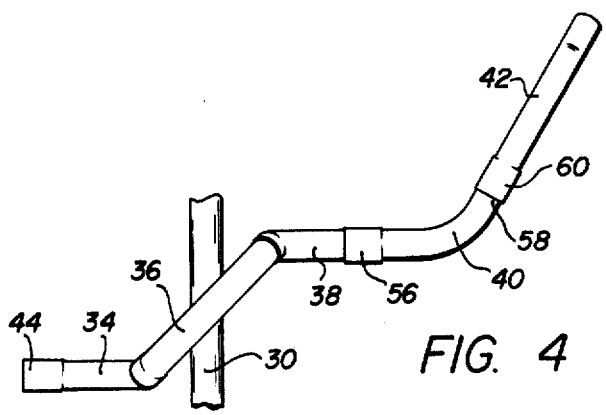
FIG. 4 is a plan view of one embodiment of the improved tail pipe system of the present invention.

In FIGS. 2, 3 and 4, the details of construction of the improved tail pipe system 26 of the present invention are illustrated without the clamps and supports installed. As can be seen, the system 26 is constructed from first, second, third, fourth and fifth separate interconnecting pieces of rigid tubing 34, 36, 38, 40 and 42, respectively.

The first piece 34 is constructed with an expanded end 44 for telescoping attachment to a conduit extending from the muffler 22. The piece 34 has an approximate 120° bend, as illustrated in FIG. 2, and terminates at its other end 46 to form a male portion.

The second piece 36 is provided with an expanded end 48 for telescoping connection with the end 46 of the first piece 34. The telescoping engagement of the ends 46 and 48 allows angular adjustment of the relative positions of pieces 34 and 36 through an angle A as illustrated in FIG. 3. The piece 36 is provided with an approximate 50° bend as illustrated in FIG. 2, and terminates at the other end 50 to form a male portion.

Another advantage of the female portion 48 on piece 36 can be understood when considering the fact that some muffler systems are provided with a conduit which extends in an upward direction, such as those on some models manufactured by Ford Motor Company. When connecting to these systems, the first piece 34 could be eliminated with piece 36 connecting directly to a muffler through end 48.

Piece 38 is provided with an enlarged female end 52 of a size for telescoping connection to the end 50 of piece 36. This interengagement of the ends 50 and 52 allows angular adjustment of the piece 38 with respect to piece 36 as illustrated in FIG. 3 by angle B. This adjustment provides versatility in the direction the portion to the rear of the automobile axle extends. The piece 38 has an approximate bend of 110° therein with the other end 54 forming a male portion.

It is at the interrelationship between pieces 36 and 38, and in some aspects 34, which allows the versatility of the improved tail pipe system of the present invention. The unique interconnection of these sections allows the tail pipe system to be used on a plurality of different vehicles by appropriately adjusting the various pieces. It is to be noted that rotation of piece 38 with respect to piece 36 is not in only one plane. The angle in the present embodiment is 110° between the ends of the piece 38. This inclination of the angle of rotation allows limited inclination of the end 54 as required or inclination of the piece 36 from the vertically extending position shown. In addition, the same versatility is provided between pieces 36 and 34, with the angle of rotation being 120°.

It is to be understood, of course, that the angles of inclination of the two axes could be varied to accomplish the same advantageous effect.

The ultimate shape of the tail pipe is determined by the particular automobile and model on which it is to be used. In the embodiment illustrated in FIGS. 1 through 4, a fourth piece 40 is provided having an end 56 for telescoping engagement with the end 54. This piece 40 has an obtuse angled bend to direct the tail pipe to the side of the automobile and has a fifth piece 42 attached to the end 58 thereof by means of an enlarged end 60 on the fifth piece 42.

Figure 5:
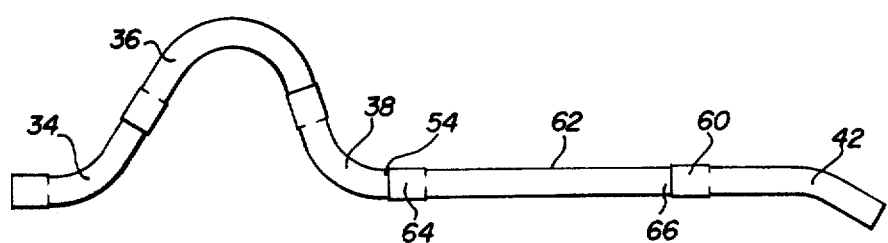
FIG. 5 is a side elevation view of another embodiment of the improved tail pipe system of the present invention.

In the embodiment illustrated in FIG. 5, end 54 of the third piece 38 has an elongated straight piece 62 attached thereto by means of an enlarged female end 64. The fifth piece 42 is attached to the other end 56 of the piece 62 by means of the enlarged end 60.

Figure 6:
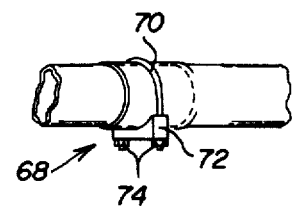
FIG. 6 is a perspective view of a typical connection between the individual sections of the improved tail pipe system of the present invention.

The various ends of the pieces are all selected to allow relative rotation between the pieces when they are telescoped. Once the exhaust systems are adjusted as desired, a clamp such as the one illustrated in FIG. 6 can be placed over the exterior of the female portion to clamp the telescoped ends together to prevent relative rotation once the tail pipe system has been rotated to its desired position. An example of this type of clamp 68 is shown in FIG. 6. This clamp comprises a U bolt 70 which extends up over the exterior of the female portion of the pipe. A bracket 72 has an arcuate surface for engaging the exterior of the pipe and bores for receiving the ends of the U bolt 70. A pair of fasteners 74 are attached with the extending ends of the U bolt 70 and are tightened to clamp the bracket 72 and U bolt 70 on the exterior of the tail pipe assembly.

It is to be understood, of course, that other configurations of the tail pipe assembly of the present invention could be constructed utilizing the improved features of the present invention.

What is claimed is:

1. A motor vehicle tailpipe for use in conveying exhaust gases from a point located to the front of the rear axle up over and to a point to the rear of the rear axle, comprising in combination:

a first portion of curved conduit having a first end for extending from a point to the front of the rear axle and a second end extending at an obtuse angle with respect to said first end in a direction toward the rear axle;

a second portion of curved conduit for extending from the first portion vertically up over the rear axle a sufficient height to clear movement of the rear axle with respect to the frame to a point to the rear of the rear axle, said second portion having a first end for connection to said second end of said first portion with the second end of said second portion extending at an acute angle with respect to said first end of said second portion;

a third portion of curved conduit for extending to the rear of said rear axle, said third portion having a first end for connection to said second end of said second portion with the second end of said third portion extending at an obtuse angle with respect to the first end of said third portion; and enlarged ends formed on said portions releasably connecting said second end of said first portion to said first end of said second portion in a gas-tight telescoping joint and releasably connecting said second end of said second portion to the first end of said third portion in a gas-tight telescoping joint, whereby the relative angular extension of said first end of said first portion with respect to the second end of said third portion can be selectively varied.

2. The tailpipe of claim 1 additionally comprising attachment means for attaching a muffler to said first portion.

3. The tailpipe of claim 1 wherein said first portion comprises a length of conduit with an approximate 120° bend therein.

4. The tailpipe of claim 1 wherein said second portion comprises a length of conduit with an approximate 50° bend therein.

5. The tailpipe of claim 1 wherein said third portion comprises a length of conduit with a 110° bend therein.

6. The tailpipe of claim 1 additionally comprising a fourth portion extending from said third portion to the rear of said vehicle.

7. The tailpipe of claim 1 additionally comprising adjustable clamp means on said telescoping joints.

8. The tailpipe of claim 1 wherein said first portion is curved at a 120° angle and said second portion is curved at a 50° angle and said third portion is curved at a 110° angle.

* * * * *